(12) United States Patent
Takahashi et al.

(10) Patent No.: US 7,064,864 B2
(45) Date of Patent: Jun. 20, 2006

(54) METHOD AND APPARATUS FOR COMPRESSING REPRODUCIBLE COLOR GAMUT

(75) Inventors: Mariko Takahashi, Tokyo (JP); Narihiro Matoba, Tokyo (JP); Shuichi Kagawa, Tokyo (JP); Hiroaki Sugiura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 968 days.

(21) Appl. No.: 09/961,446

(22) Filed: Sep. 25, 2001

(65) Prior Publication Data

US 2002/0041393 A1  Apr. 11, 2002

(30) Foreign Application Priority Data

Oct. 10, 2000  (JP)  ............................. 2000-309452

(51) Int. Cl.
*G06F 15/00*  (2006.01)
(52) U.S. Cl. ..................... 358/1.9; 358/515; 358/518; 345/589; 345/590; 345/604; 382/162; 382/166; 382/167
(58) Field of Classification Search ................ 358/515, 358/518, 1.9, 500; 345/589, 590, 604; 382/162, 382/167, 166; 347/15
See application file for complete search history.

(56) References Cited

U.S. PATENT DOCUMENTS

| | | | | | |
|---|---|---|---|---|---|
| 5,363,218 | A | * | 11/1994 | Hoshino | 358/518 |
| 5,740,076 | A | * | 4/1998 | Lindbloom | 345/590 |
| 5,748,342 | A | * | 5/1998 | Usami | 358/500 |
| 5,754,184 | A | * | 5/1998 | Ring et al. | 345/604 |
| 5,809,164 | A | * | 9/1998 | Hultgren, III | 382/162 |
| 5,933,253 | A | * | 8/1999 | Ito et al. | 358/500 |
| 5,982,925 | A | * | 11/1999 | Koizumi et al. | 382/166 |
| 5,991,511 | A | * | 11/1999 | Granger | 358/1.9 |
| 6,041,136 | A | * | 3/2000 | Ohga | 382/162 |
| 6,154,217 | A | * | 11/2000 | Aldrich | 345/589 |
| 6,301,383 | B1 | * | 10/2001 | Ito et al. | 382/162 |
| 6,359,703 | B1 | * | 3/2002 | Yabe | 358/1.9 |
| 6,360,008 | B1 | * | 3/2002 | Suzuki et al. | 382/167 |
| 6,381,361 | B1 | * | 4/2002 | Silverbrook et al. | 382/162 |
| 6,504,950 | B1 | * | 1/2003 | Murashita et al. | 382/162 |
| 6,719,392 | B1 | * | 4/2004 | Qiao | 347/15 |
| 6,724,507 | B1 | * | 4/2004 | Ikegami et al. | 358/518 |

FOREIGN PATENT DOCUMENTS

| | | |
|---|---|---|
| JP | 4-119765 A | 4/1992 |
| JP | 4-181872 A | 6/1992 |
| JP | A4284579 | 10/1992 |
| JP | A099087 | 1/1997 |
| JP | A974494 | 3/1997 |

(Continued)

*Primary Examiner*—Kimberly Williams
*Assistant Examiner*—Beniyam Menberu
(74) *Attorney, Agent, or Firm*—Birch,Stewart,Kolasch & Birch,LLP

(57) ABSTRACT

A reproducible color gamut compression apparatus is provided that includes: a target reproducible color gamut computing unit for computing a target reproducible color gamut; a compression ratio computing unit for computing a compression ratio, based on reproducible color gamuts of display devices and on the target reproducible color gamut; a compression method determination information acquiring unit for acquiring information used to determine a compression method; a compression method determining unit for determining a method of compressing a source reproducible color gamut, based on the compression method determination information; and a reproducible color gamut compressing unit for converting the source reproducible color gamut into the target reproducible color gamut, using the determined compression method.

16 Claims, 4 Drawing Sheets

FOREIGN PATENT DOCUMENTS

| | | |
|---|---|---|
| JP | A998298 | 4/1997 |
| JP | A9168097 | 6/1997 |
| JP | A9270927 | 10/1997 |
| JP | A10200764 | 7/1998 |
| JP | A10210275 | 8/1998 |
| JP | A10229500 | 8/1998 |
| JP | 10-294877 A | 11/1998 |
| JP | A1169189 | 3/1999 |
| JP | A11141209 | 5/1999 |
| JP | 11-284873 A | 10/1999 |
| JP | A11275377 | 10/1999 |
| JP | A11341296 | 12/1999 |

\* cited by examiner

METHOD AND APPARATUS FOR COMPRESSING REPRODUCIBLE COLOR GAMUT

BACKGROUND OF THE INVENTION

1. Field of the Invention

The present invention generally relates to reproducible color gamut compression apparatuses and reproducible color gamut compression methods and, more particularly, to a method and apparatus of reproducible color gamut compression, adapted for a combination of a plurality of color display devices such as monitors that are different in reproducible color gamut, for converting a color that cannot be reproduced by a target display device into a reproducible color. More particularly, the invention relates to a reproducible color gamut compression method and a reproducible color gamut compression apparatus, in which the reproducible color gamut is compressed depending on a characteristic factor, the volume of computation is small and the processing speed is relatively high.

2. Description of the Related Art

For example, Japanese Laid-Open Patent Application No. 9-9829 discloses a reproducible color gamut compression method designed to meet such demands. Japanese Laid-Open Patent Application 9-98298 proposes a reproducible color gamut compression method and a reproducible color gamut compression apparatus adapted for color DTP (Desk Top Publishing) wherein a consideration is given to differences between display devices in reproducible color gamut so that natural color reproduction is effected. The apparatus and method disclosed in Japanese Laid-Open Patent Application 9-98298 realize smooth reproducible color gamut compression for an image characterized by a relatively high color saturation, by using different compression methods for different areas.

FIG. 8 is schematic view of a reproducible color gamut compression process according to the reproducible color gamut compression method disclosed in Japanese Laid-Open Patent Application 9-98298. The color reproduction gamut compression method is such that an area outside the color gamut, which is reproducible by a monitor but not reproducible by a printer, is divided into three areas so that compression occurs in the respective areas.

A description will now be given of how the reproducible color gamut compression method is performed.

Given that a reproducible color gamut GMout of an output device is smaller than a reproducible color gamut GMin of an input device, and a hue h is constant, two straight lines are drawn in a plane defined by an axis of brightness L* and an axis of color saturation C* so as to divide the reproducible color gamut GMin of the input device is into four areas including a common area AR1, a high-brightness area AR2, a low-brightness area AR3 and a high color saturation area AR4. Color gamut compression is performed for each of the areas AR1-AR4, the direction of compression being different from area to area. In this manner, a color residing in the reproducible color gamut GMin of the input system is converted into a color residing in the reproducible color gamut GMout of the output device.

A color residing in the common area AR1 shared by the input reproducible color gamut GMin and the output reproducible color gamut GMout is not subject to conversion. The high-brightness area AR2 is subject to compression toward (0, L*_min), and the high color saturation area AR4 is subject to compression toward (C*_th, L*th). L*_min indicates a minimum value of brightness of the output reproducible color gamut GMout and L*_max indicates a maximum value of brightness of the input reproducible color gamut GMin and the output reproducible color gamut GMout, C*max, L*_th indicate a maximum value of color saturation in the output reproducible color gamut GMout and an associated brightness, respectively. C*_th=C*_max×K, where K is a positive number smaller than 1.

By using the related-art color gamut compression method, i.e., by drawing two straight lines on a plane defined by brightness and color saturation under a condition that the reproducible color gamut GMout of the output device is smaller in area than the reproducible color gamut GMin of the input device and that the hue is constant, dividing the input reproducible color gamut GMin into four areas by the two straight lines, performing color gamut compression in directions different from area to area so that a color residing in the input reproducible color gamut GMin is converted into a color residing in the output reproducible color gamut GMout, the color gamut compression ensures natural appearance of colors.

One disadvantage with the color gamut compression method according to the related art is that the directions of compression differ from area to area in a discontinuous manner so that the smooth transition between colors cannot be ensured at the borders between adjacent areas. The related-art color gamut compression is capable of compression wherein vividness of an image with high color saturation is maintained. In contrast, however, a color in the high-brightness area AR2 is converted into a less vivid color and a color in the low-brightness area AR3 is converted into a color characterized by upward level shift of blackness. Upward level shift of blackness does not present a problem in a combination of a monitor and a printer because the capability of a printer to reproduce gradation in the low-brightness area AR3 is inherently low. However, upward level shift of blackness presents a problem in a combination of monitors. Thus, the visible effect produced by the related-art color gamut compression is different from image to image. If an image is characterized by a small low-brightness area AR3, the related-art method may be favorably applied, causing no problem of upward level shift of blackness. If an image is characterized by a large high color saturation area AR4, a significant favorable effect is provided. Another disadvantage with the related-art color gamut compression is that it takes a relatively long period of time for color space conversion since the color gamut compression is performed in the LAB color space. Real-time compression is difficult and the method is not suitably used for a display device such as a monitor.

Similar color gamut compression methods are disclosed in Japanese Laid-Open Patent Application No. 11-341296, Japanese Laid-Open Patent Application No. 4-284579, Japanese Laid-Open Patent Application No. 9-9087, Japanese Laid-Open Patent Application No. 9-74494, Japanese Laid-Open Patent Application No. 9-168097, Japanese Laid-Open Patent Application No. 11-141209, Japanese Laid-Open Patent Application No. 10-200764, Japanese Laid-Open Patent Application No. 10-229500, Japanese Laid-Open Patent Application No. 10-210275, Japanese Laid-Open Patent Application No. 11-275377, and Japanese Laid-Open Patent Application No. 11-69189.

As described, since the related-art color gamut compression method involves a problem in that upward level shift of blackness may be produced when a color in the low-brightness area AR3 is subject to compression. Upward level shift of blackness does not present a problem if a target display device is a printer. But it does present a problem in a monitor. The result of color gamut compression according to the related art depends heavily on the characteristic of image. If every image is subject to the same process of color gamut compression, it is not ensured that resulting images successfully pass predetermined criteria of evaluation. Since the continuity between the areas AR1–AR4 is poor and the color gamut compression is performed in the LAB color space, it takes a relatively long period of time to perform color space conversion, thus making it difficult to process compression on a real time basis. Accordingly, the related-art method is not suitable for a monitor.

SUMMARY OF THE INVENTION

Accordingly, a general object of the present invention is to provide a method and apparatus for reproducible color gamut compression in which the aforementioned problems are eliminated.

Another and more specific object is to provide a method and apparatus for reproducible color gamut compression, in which unnaturalness is reduced, division of color space is not performed so that color reproduction with smooth transition between colors is possible, computation is performed in a color space of an input signal or in the chromaticity coordinates so that there is no need for color space conversion, the processing speed is relatively high, and real-time processing is possible as a result of less heavy load on a CPU.

A first exemplary embodiment of the invention allows computation of a compression ratio, based on a target reproducible color gamut and reproducible color gamuts of a plurality of display devices. A method of compressing a source reproducible color gamut is determined based on compression method determination information. The source reproducible color gamut is converted into the target reproducible color gamut using the determined compression method. Where the display devices differ in reproducible color gamut, a color not reproducible in a target display device is converted into a reproducible color. Since reproducible color gamut compression adapted for an image is performed, color reproduction in which unnaturalness is reduced is available. Since division of color space is not performed, color reproduction with smooth transition between colors is possible. Moreover, since the computation is performed in a color space of the input image data or in the chromaticity coordinates, there is no need for color space conversion. The processing speed is relatively high. Real-time processing is possible as a result of less heavy load on a CPU.

A second exemplary embodiment of the invention allows determination of a method of compressing a source reproducible color gamut, based on the compression method determination information acquired as a result of computation on an characteristic factor extracted by analyzing a distribution pattern of data of an image to be displayed, and on a reference value. Accordingly, it is possible to select a method of compressing a reproducible color gamut depending on an image type. Natural-looking and highly-precise color reproduction is thus available.

A third exemplary embodiment of the invention allows one of a tone-level distribution, a color saturation level distribution and a brightness level distribution, determined from pixel-by-pixel signal values of the image data, to be examined in extracting the characteristic factor. Accordingly, it is possible to select a method of compressing a reproducible color gamut depending on an image type. Natural-looking and highly-precise color reproduction is thus available.

A fourth exemplary embodiment of the invention allows determination of a method of compressing a source reproducible color gamut, based on an image pattern selected by a user. Accordingly, it is possible to select a method of compressing a reproducible color gamut suitable for the user's preference depending on the viewing environment and purposes.

A fifth exemplary embodiment of the invention allows computation of the compression ratio of complementary colors of three color signals constructing the data of an image to be displayed, based on the principle of the additive process of colors, so that the compression ratio is applied for each hue. It is thus possible to select a method of compressing a reproducible color gamut depending on a hue.

A sixth exemplary embodiment of the invention allows computation of a ratio of compressing a reproducible color gamut, in an input color space or in chromaticity coordinates, so that there is no need for color space conversion, the processing speed is relatively high, and real-time processing is possible as a result of less heavy load on a CPU.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

First Embodiment

Figure 1:
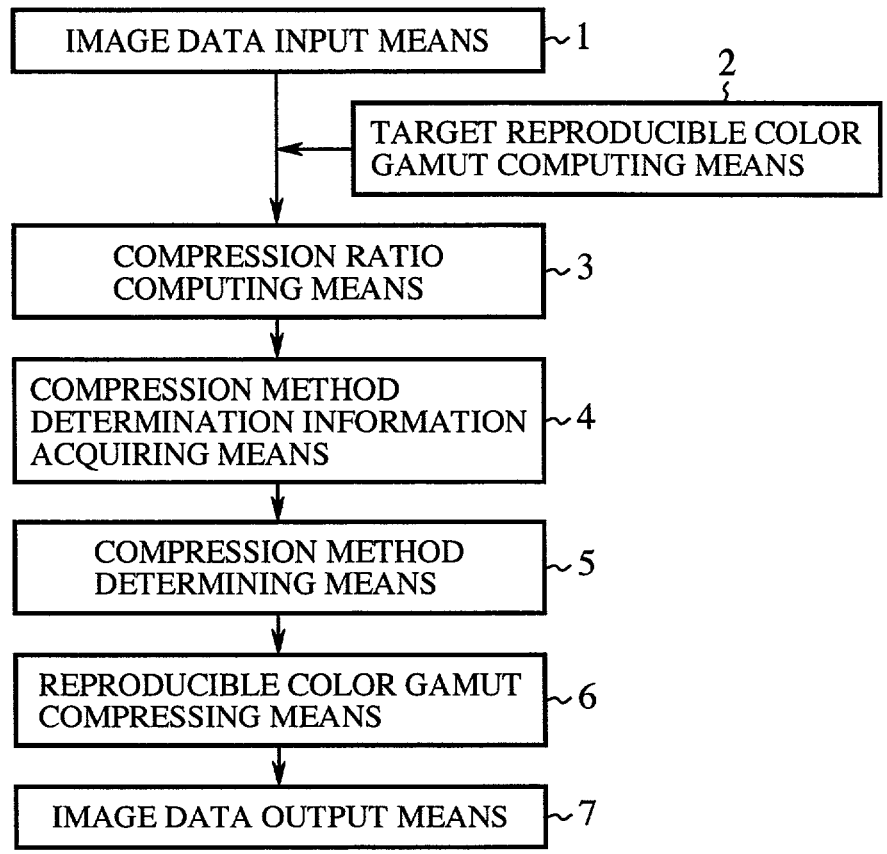
FIG. 1 shows a construction of a color gamut compression apparatus according to a first embodiment of the present invention.

FIG. 1 shows a construction of a reproducible color gamut compression apparatus according to the first embodiment. Referring to FIG. 1, the reproducible color gamut compression apparatus comprises an image data input means receiving an image data including three color signals, and performing a process on the input image. A target reproducible color gamut computing means computes a target reproducible color gamut. A compression ratio computing means 3 computes a ratio of compression, based on a reproducible color gamut of a display device such as a liquid crystal panel, a CRT, a digital light processing (DLP) device and a projector, and based on a target reproducible color gamut computed by the target reproducible color gamut computation means 2. A compression method determination information acquiring means acquires information for determining a method of compressing a reproducible color gamut. A compression method determining means 5 determines a method of compressing a source reproducible color gamut, based on the compression method determination information acquired by the compression method determination information acquiring means 4. A reproducible color gamut compressing means 6 compresses an image data using the reproducible color gamut compression method determined by the compression method determining means 5 so as to convert the image data into colors residing in the target reproducible color gamut. An image data output means 7 outputs the image compressed by the reproducible color gamut compressing means 6 to a display device.

A description will now be given of the operation according to the first embodiment.

An image data including three color signals is input to the image data input means 1. Upon receipt of the image data, the image data input means 1 subjects the image data to a pre-process before outputting the processed data to the compression ratio computing means 3. The pre-process may include gradation correction, pixel count conversion or hue correction, adapted for the input image data. The target reproducible color gamut computing means 2 determines the target reproducible color gamut, based on the color reproduction characteristics of two different display devices, and outputs the result of determination to the compression ratio computing means 3. The compression ratio computing means 3 computes a ratio of compression, based on the reproducible color gamut of the display devices and the reproducible color gamut computed by the target reproducible color gamut computing means 2. More specifically, the compression ratio computing means 3 computes a ratio of compression toward a boundary of target reproducible color gamut, based on the three color signals included in the image data, information relating to the target reproducible color gamut input from the target reproducible color gamut computing means 2. The compression ratio computing means 3 then outputs the ratio thus determined to the compression method determination information acquiring means 4.

Upon receipt of the ratio of compression from the compression ratio computing means, the compression method determination acquiring means 4 acquires information, such as an characteristic factor, for determining the method of compression. The compression method determination information acquiring means 4 then outputs the information to the compression method determining means 5. The compression method determining means 5 selects a method of compressing the reproducible color gamut, based on the information (characteristic factor) output from the compression method determination information acquiring means 4, the selection being done from reproducible color gamut compression methods stored in a memory (not shown). The compression method determining means 5 then outputs the information relating to the compression method to the reproducible color gamut compressing means 6. The reproducible color gamut compressing means 6 compresses the image data, performs conversion of the reproducible color gamut, generates three color signals constituting the compressed image data, based on the three color signals included in the image data, the ratio of compression received from the compression ratio computing means 3, and the information related to the compression method received from the compression method determining means 5. The three color signals of the compressed image data are sent to the image data outputting means 7 so as that the image is displayed on a liquid crystal panel, a CRT, a DLP device or a projector. The image data output means 7 may display the image after subjecting the image to gradation correction or data format conversion adapted for the characteristic of the display device.

A detailed description will now be given of the operations of the respective means shown in FIG. 1.

The operation of the target reproducible color gamut computing means 2 will be described first. The target reproducible color gamut computing means 2 is provided with a function of determining by computation a reproducible color gamut common to a plurality of display devices so that the colors reproducible in the respective devices are properly mapped to each other.

Figure 2:
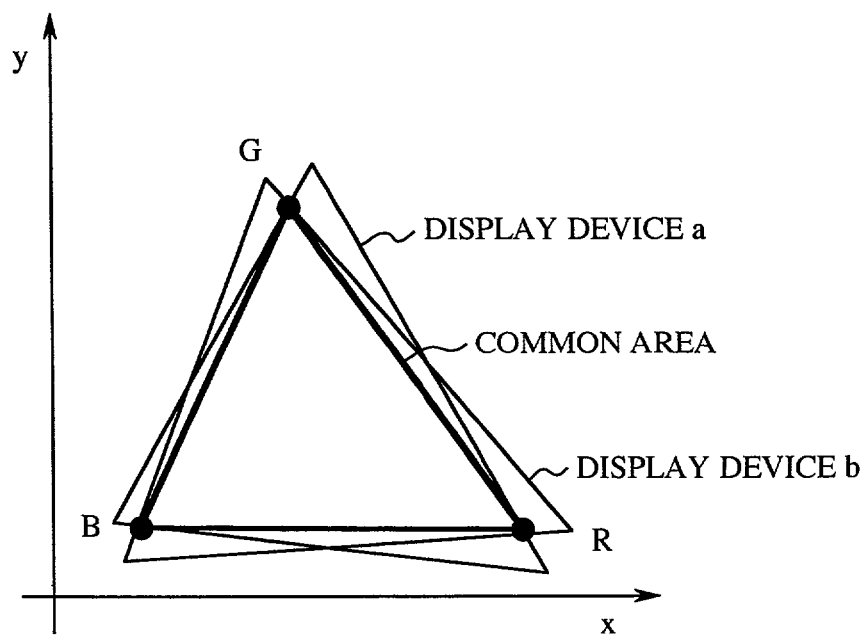
FIG. 2 illustrates a process of computation in a target reproducible color gamut computing means.

FIG. 2 shows a method of computation employed by the target reproducible color gamut computing means 2. As shown in FIG. 2, display devices a and b are evaluated to determine triangles defined by straight lines between points indicating chromaticity values of R (255, 0, 0), G (0, 255, 0) and B (0, 0, 255) on a x-y space. Points of intersection of the two triangles associated with the respective display devices are determined by computation. Of the triangles formed by these points of intersection, a triangle formed by the points closest to the respective R, G, B chromaticity points of the two display devices is chosen as a common reproducible color gamut (common area). When Y (brightness) of each of R, G, B is different from device to device, Y of a vertex of the triangle determined according to the aforementioned step is determined by Y (c, min)<Y (c, calc)<Y (c, max), where c indicates one of R, G, B colors, Y (c, min) indicates a minimum value of Y of the color c reproducible by one of the two devices, and Y (c, max) indicates a maximum value of Y of the color c reproducible by one of the two devices.

The chromaticity values (x, y, Y) thus computed is input to the compression ratio computing means 3 as reproducible color gamut information of the two display devices. Y of the color "white" reproducible by one devices is compared with that of the other device so that the chromaticity value (x, y, Y) of the device characterized by a lower Y value is output as the reproducible color gamut information of the color "white". When the reproducible color gamut of the display device a is included in the reproducible color gamut of the display device b, the reproducible color gamut of the display device a is designated as the common reproducible color gamut.

Figure 3:
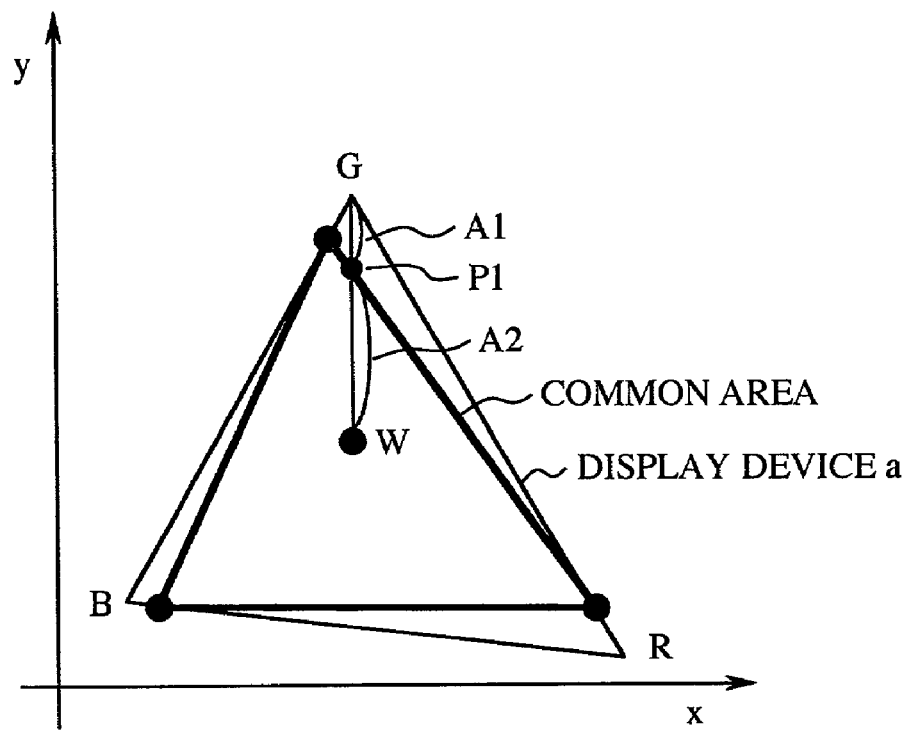
FIG. 3 illustrates a process of computation in a compression ratio computing means.

A description will now be given of the compression ratio computing means 3. The compression ratio computing means 3 is provided with a function of computing a maximum ratio of compression, based on the reproducible color gamut information input from the target reproducible color gamut computing means 2. FIG. 3 illustrates a method of computing the maximum compression ratio. The triangle of the display device b shown in FIG. 2 is not necessary so that FIG. 3 only shows the triangle of the display device a and the triangle representing the common area.

Upon receipt of the reproducible color gamut information from the target reproducible color gamut computing means 2, the compression ratio computing means 3 determines by computation a point of intersection between a side of the triangle defining the common area and a line connecting the vertex of the triangle of the display device a and "white" (W). The maximum compression ratio is determined as A1:A2, where A1 indicates a distance between the vertex of the triangle of the display device a and the point P1, and A2 indicates a distance between the point P1 and white (W). The compression ratio computing means 3 computes the maximum compression ratio for each of R, G, B and outputs the respective ratios to the compression method determination information acquiring means 4.

In the illustrated example, the compression ratio is determined using the x-y chromaticity space. Alternatively, the ratio may be computed using a color space of the input system obtained by conversion from the XYZ chromaticity coordinate system.

A description will now be given of the compression method determination information acquiring means 4. The compression method determination information acquiring means 4 is provided with a function of acquiring information related to determination of the compression method by analyzing the R, G, B color signals of the image data. The information related to the determination includes the characteristic factor obtained by analysis of the image data. There is no single reproducible color gamut compression method that can be successfully applied to every image. The compression method is image-dependent. Different compression methods may be used for different environments in which the display device is installed, and for different purposes and usage. For example, if an image is rich in bright tones or in dark tones, the compression method is applied such that the gradation in the bright-tone portion or the dark-tone portion is maintained. If the tone distribution is so evenly as to cover the entire dynamic range, the compression method that equally compresses the area outside the reproducible color gamut is suitably used. Thus, it is preferable that the compression method be determined based on information such as the distribution of the tone levels. For this purpose, the compression method determination information acquiring means 4 is provided with the function of acquiring the information for determination of the compression method.

A description will now be given of the operation of information acquisition. The R, G, B data of the pixels of the image to be displayed are used to determine the tone distribution characteristic. The criterion for computing the distribution may be a minimum value or a maximum value of R, G, B of each pixel, a difference between a maximum value and a minimum value of R, G, B, or a sum of R, G, B values. If the difference between the maximum value and the minimum value of R, G, B of a pixel is used as a reference to compute the distribution, a distribution relating to color saturation is obtained. In this case, a method adapted for exclusively compressing areas with high color saturation may be suitably used. If the minimum value of R, G, B of a pixel is used as a reference to compute the distribution, a distribution relating to the brightness, capable of successfully reproducing an image with low brightness, is obtained. To images profiled by such a distribution, a compression method adapted for maintaining the gradation of the low-brightness area may be favorably used. If the maximum value of R, G, B of a pixel is used as a reference to compute the distribution, or if the sum of the R, G, B values of a pixel is used as a reference, the principle of additive process of colors ensures that a light-quantity distribution, relating to a sum of the quantity of light, is obtained. Accordingly, a process targeting the brightness of the image may be suitably performed.

Alternatively, a combination of the above-described methods may be employed to determine an associated distribution, so that a compression method suitable for the distribution may be used. For example, by using the maximum value of R, G, B and the minimum value of R, G, B as references, a distribution indicating the border of a reproducible color gamut is known. In order to process an image profiled by such a distribution, a compression method adapted for compressing the entirety of the reproducible color gamut may be suitably used. A linear compression method may be applied to an image rich in dark tones or an image rich in bright tones. A non-linear compression method using approximation by high-order functions may be applied to images that are not rich in dark tones or bright tones. A clipping compression method may be applied to an image profiled by color saturation distribution adjacent to and inside the border of the reproducible color gamut.

If an image in which dark tones are not thinned out is preferable, a compression method adapted for lowering the tone of dark-tone areas is favorable. In such a case, the linear compression method is used.

A description will now be given of the compression method determining means 5. The compression method determining means 5 is provided with a function of selecting a compression method suitable for the characteristic factor, based on the compression method determination information supplied from the above-mentioned compression method determination information acquiring means 4. Methods of compression adapted for the characteristic factor include the linear compression method, the non-linear compression method and the clipping compression method. The linear compression method may be used when an image is prominently rich in halftones. If an tone distribution is so evenly as to cover the entire dynamic range, the non-linear compression method is used.

Figure 4:
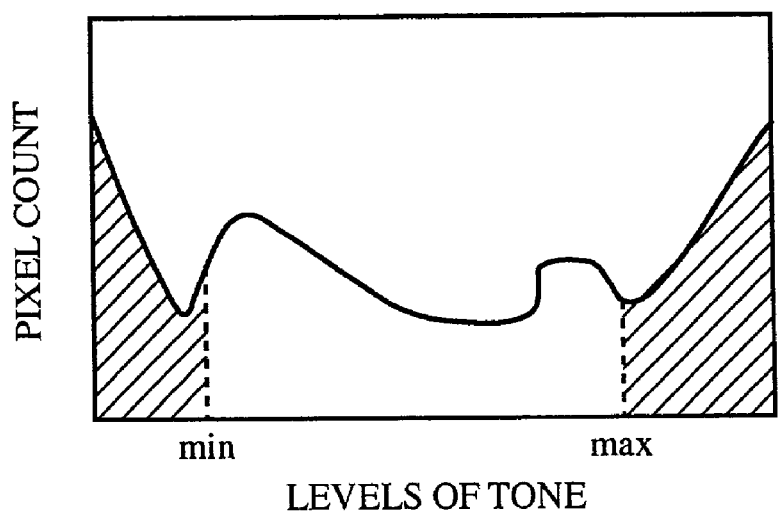
FIG. 4 illustrates a condition of determination by a compression method determining means.

FIG. 4 shows a distribution of pixel count for each level of tone, illustrating how a compression method is determined by the compression method determining means 5. When the pixel count for a range of tone levels between min % and max % exceeds const % of the total pixel count, the linear compression method is employed. In FIG. 4, min indicates a threshold level marking a dark-tone range, wherein 0<min<25[%], max indicates a threshold level marking a bright-tone range, wherein 75<max<100[%]. Referring also to FIG. 4, const indicates a parameter for determining a pattern of tone distribution, wherein 0<const<30[%].

When the dispersion characterizing the distribution of pixel count over a range of tone levels is below, for example, a predetermined level $2a$, the non-linear compression method is used. If the distribution shown in FIG. 4 is normalized to a normalized distribution ranging between 0 and 1, the value of $\alpha$ may be, for example, 0.15. However, other values for a may also be prescribed.

A description will now be given of the reproducible color gamut compressing means 6. The reproducible color gamut compressing means 6 is provided with a function of performing reproducible color gamut compression using the color reproduction compression method determined by the compression method determining means 5 under the condition described above. The three color signals of the compressed image data is sent to the image data output means 7. The image data output means 7 then outputs the image data to the display device.

Thus, according to the first embodiment, color gamut compression adapted for the mage is performed. Therefore, color reproduction in which unnaturalness is reduced is available. Since division of color space is not performed, color reproduction with smooth transition between colors is possible. Moreover, since the computation is performed in a color space of the input image data or in the chromaticity coordinates, there is no need for color space conversion. The processing speed is relatively high. Real-time processing is possible as a result of less heavy load on a CPU.

Second Embodiment

Figure 5:
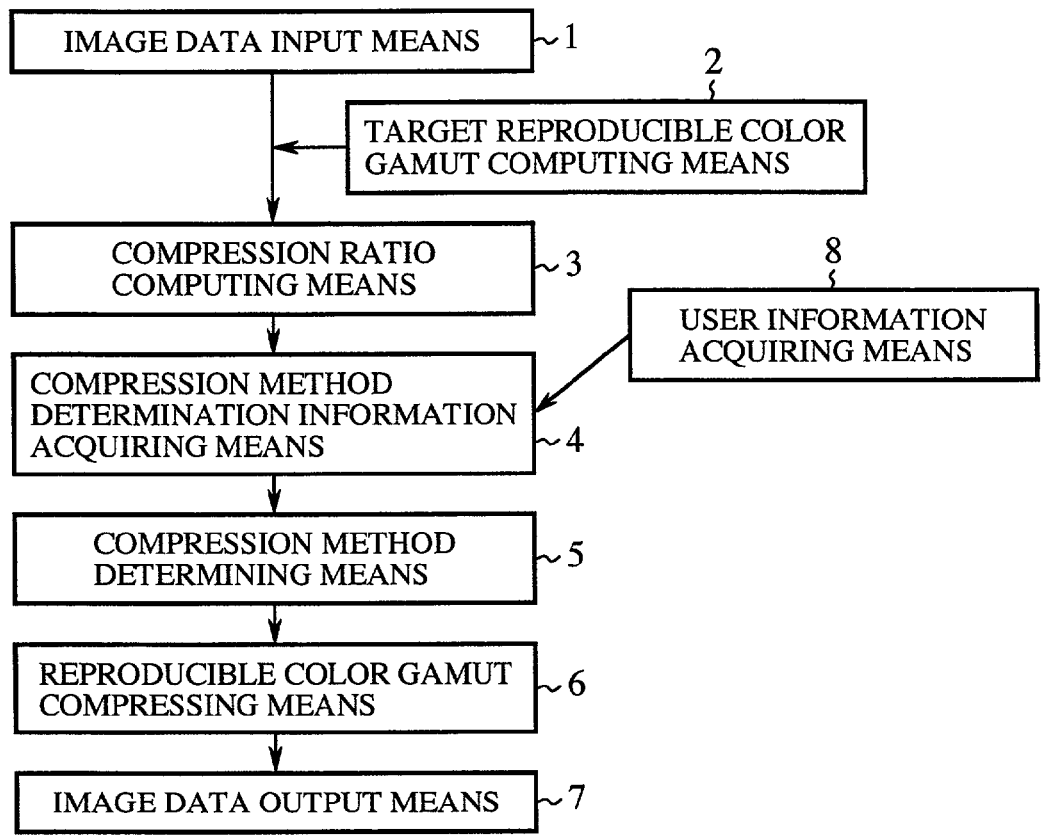
FIG. 5 shows a construction of a color gamut compression apparatus according to a second embodiment of the present invention.

According to the first embodiment, the compression method determination information (characteristic factor) is derived from analysis of the distribution pattern of the image data. The compression method is determined based on the information thus derived. The second embodiment provides an alternative in which the information referred to in determining a compression method is acquired from an image pattern selected by a user. The compression method is selected based on the acquired information. FIG. 5 shows how the reproducible color gamut compression according to the second embodiment is constructed.

Referring to FIG. 5, the color gamut compression apparatus comprises the image data input means 1, the target reproducible color gamut computing means 2, the compression ratio computing means 3, the compression method determining means 5, the reproducible color gamut compressing means, and the image data output means 7. In FIGS. 1 and 5, like numerals represent like elements, and the description thereof is omitted. The reproducible color gamut compression apparatus further comprises a user information acquiring means 8 for acquiring information related to an image pattern selected by a user, in the form user information. The compression method determination information acquiring means 4 according to the second embodiment differs from that of the first embodiment shown in FIG. 1 in that the compression method determination information is acquired from the user information acquired by the user information acquiring means 8.

A description will now be given of the operation.

The image data input means 1 pre-processes the three color signals of the input image data before outputting the image data to the compression ratio computing means 3. The target reproducible color gamut computing means 2 determines the target reproducible color gamut, based on the color reproduction characteristics of two different display devices, and outputs the result of determination to the compression ratio computing means 3. The compression ratio computing means 3 computes a ratio of compression toward a boundary of target reproducible color gamut, based on the three color signals included in the image data, information relating to the target reproducible color gamut input from the target reproducible color gamut computing means 2.

The user information acquiring means 8 presents image patterns to the user to allow selection using a user interface. Information related to the image pattern selected by the user is acquired in the form of user information and output to the compression method determination information acquiring means 4. The compression method determination information acquiring means 4 acquires the compression method determination information for determining the compression method, based on the user information thus supplied, and delivers the compression method determination information to the compression method determining means 5. The compression method determining means 5, receiving the compression method determination information, which is based on the user information, selects a method of compressing the reproducible color gamut, the selection being done from reproducible color gamut compression methods stored in a memory (not shown). The compression method determining means 5 then outputs the information relating to the compression method to the reproducible color gamut compressing means 6. The reproducible color gamut compressing means 6 compresses the reproducible color gamut, based on the three color signals included in the image data, the ratio of compression received from the compression ratio computing means 3, and the information related to the compression method received from the compression method determining means 5. The reproducible color gamut compressing means 6 then outputs the three color signals of the compressed image data.

Figure 6:
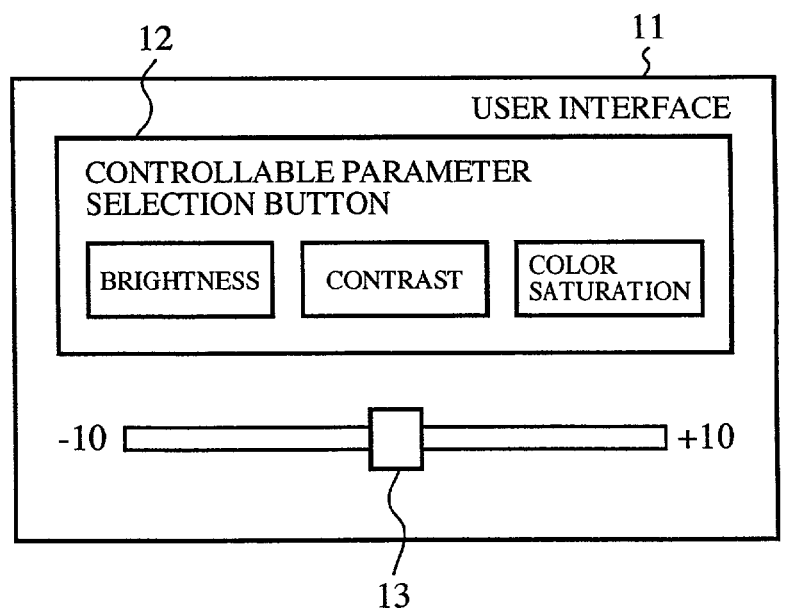
FIG. 6 shows a user interface of user information acquiring means according to the second embodiment.

The reproducible color gamut compression according to the second embodiment allows selection of a parameter that is given priority in performing reproducible color gamut compression. In contrast to the first embodiment, where the compression method determination information is derived, by computation, from the characteristic factor obtained by analyzing the distribution pattern of the image, the reproducible color gamut compression according to the second embodiment determines the compression method determination information depending on the user selection. That is, the user is allowed to select a parameter that is given a priority in determining the reproducible color gamut compression. FIG. 6 shows an example of user interface provided in the user information acquiring means 8. Referring to FIG. 6, a user interface 11 includes a controllable parameter selection button 12 that allows a user to select a parameter related to the compression method, and a compression level control bar for designating the level of compression related to the parameter selected by the controllable parameter selection button. 12.

The controllable parameter selection button 12 displays parameters "brightness", "contrast" and "color saturation" related to the compression method, i.e., parameters related to the characteristic factor, so that the user is given a choice of a priority parameter. If "contrast" is selected by the user, the user is then allowed to select the desired degree of contrast using the compression level control bar 13 below. The scale of +10 to the left of the compression level control bar 13 indicates the highest contrast and −10 to the right indicates the lowest contrast. The selected parameter and compression level is output to the compression method determining means 5 wherein a selection of the compression method is made. Assuming that "contrast" is selected and +10 is selected, a compression method adapted to lower the tone of low-tone areas is selected.

Thus, according to the second embodiment, it is possible to perform reproducible color gamut compression in accordance with the user preference. Color reproduction in which unnaturalness is reduced is available. Since division of color space is not performed, color reproduction with smooth transition between colors is possible. Moreover, since the computation is performed in a color space of the input image data or in the chromaticity coordinates, there is no need for color space conversion. The processing speed is relatively high. Real-time processing is possible as a result of less heavy load on a CPU.

Third Embodiment

Figure 7:
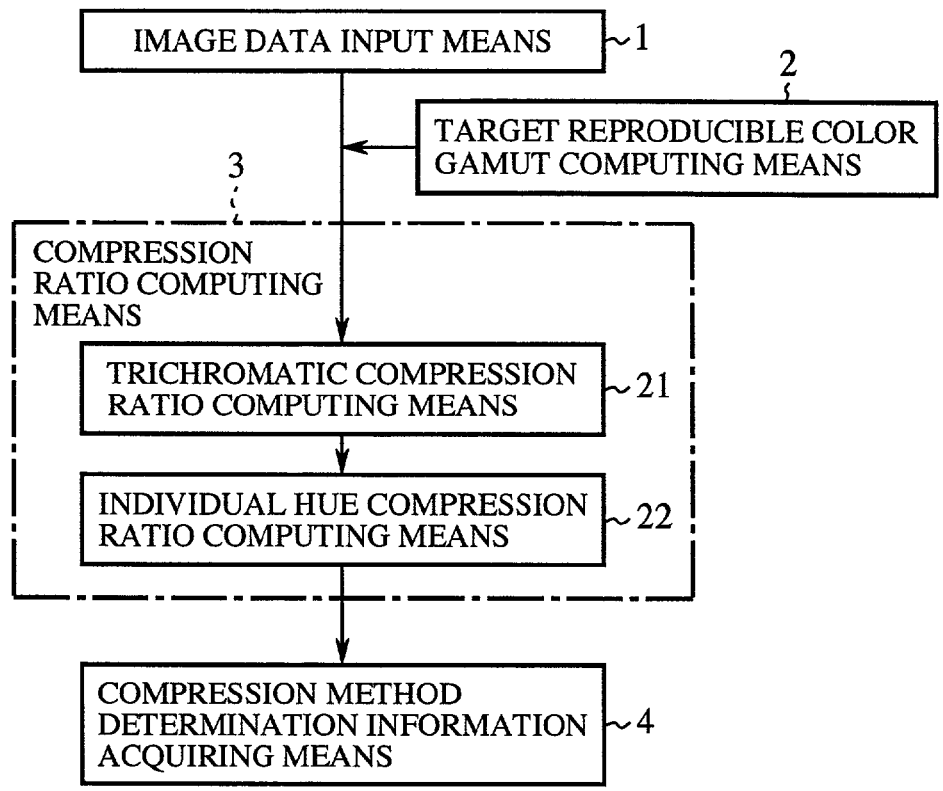
FIG. 7 shows a construction of a compression ratio computing means in the color gamut compression apparatus according to a third embodiment of the present invention.
Figure 8:
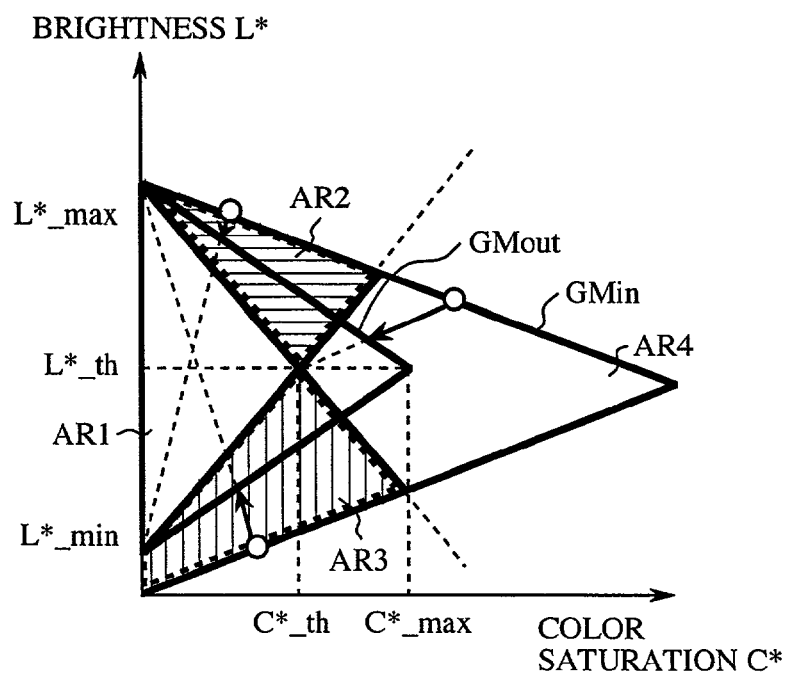
FIG. 8 is a schematic view of reproducible color gamut compression process according to the related art.

FIG. 7 shows an example of a construction of the compression ratio computing means 3 adapted for the reproducible color gamut compressing method according to the third embodiment. Referring to FIG. 8, the reproducible color gamut compression apparatus according to the third embodiment comprises a trichromatic compression ratio computing means 21 for computing a compression ratio, described in the first and second embodiments, for each of the three primary colors constructing the image data. An individual hue compression ratio computing means 22 computes, for each hue, the compression ratio of a complementary color of each of the three color signals, according to the principle that enable an additive process of colors. The compression ratio computing means 3 includes the trichromatic compression ratio computing means 21 and the individual hue compression ratio computing means 22. The other components of the reproducible color gamut compression apparatus are the same as the corresponding components assigned like numerals and shown in FIG. 1.

A description will now be given of the operation.

The three color signals constructing the input image data is pre-processed by the image data input means 1 and supplied to the compression ratio computing means 3. The target reproducible color gamut computing means 2 determines the target reproducible color gamut, based on the color reproduction characteristics of two different display devices, and outputs the result of determination to the compression ratio computing means 3. In a similar construction to the first embodiment, the trichromatic compression ratio computing means 21 of the compression ratio computing means 3 computes, for each of the three primary colors of the three signals constructing the image data, a ratio of compression toward a boundary of target reproducible color gamut, based on the information related to the reproducible color gamut supplied from the target reproducible color gamut computing means 2. The compression ratio computing means 3 then outputs the compression ratio thus computed to the compression method determination information acquiring means 4.

When the display device is of a type characterized by the additive process of colors, every color is represented by an additive process of three primary colors. Thus, the compression ratio of C, M, Y, complementary to the three primary colors, is computed linearly in accordance with the proportion of the three primary colors added. Given the compression ratio of the three primary colors, it is not only possible to compute the compression ratio of the complementary colors but also to compute the compression ratio for each hue. When the display device is of the type characterized by the additive process, the individual hue compression ratio computing means 22 computes for each hue the compression ratio of the complementary colors of the three color signals constructing the image data according to the principle of additive process. The individual hue compression ratio computing means 22 then outputs the compression ratio thus computed to the compression method determination information acquiring means 4. The subsequent steps of operation performed are the same as the corresponding steps of the foregoing embodiments.

Thus, according to the third embodiment, a highly precise color reproduction for images is available by varying the compression ratio for each hue. In a similar configuration to the first embodiment, reproducible color gamut compression adapted for the image is performed so that color reproduction in which unnaturalness is reduced is available. Since division of color space is not performed, color reproduction with smooth transition between colors is possible. Moreover, since the computation is performed in a color space of the input image data or in the chromaticity coordinates, there is no need for color space conversion. The processing speed is relatively high. Real-time processing is possible as a result of less heavy load on a CPU.

The present invention is not limited to the above-described embodiments, and variations and modifications may be made without departing from the scope of the present invention.

What is claimed is:

1. A reproducible color gamut compression method adapted for a combination of a plurality of display devices that are different in reproducible color gamut, for converting a color not reproducible by a target display device into a reproducible color, comprising the steps of:
   computing a target reproducible color gamut, based on color reproduction characteristics of the plurality of devices, so as to produce reproducible color gamut information;
   computing a compression ratio used to compress a source reproducible color gamut, based on a reproducible color gamut of the target device and the reproducible color gamut information;
   acquiring compression method determination information;
   determinig a method of compressing the source reproducible color gamut, using the compression method determination information; and
   converting the source reproducible color gamut into the target reproducible color gamut, using the compression method thus determined.

2. The reproducible color gamut compression method according to claim 1, further comprising the steps of:
   extracting a characteristic factor by analyzing a distribution pattern of data of an image to be displayed; and
   determining the method of compressing the source reproducible color gamut based on the compression method determination information acquired as a result of computation on the extracted characteristic factor and a predetermined reference value.

3. The reproducible color gamut compression method according to claim 2, wherein one of a tone-level distribution, a color saturation level distribution and a brightness level distribution, determined from pixel-by-pixel signal values of the image data, is examined in extracting the characteristic factor.

4. The reproducible color gamut compression method according to claim 1, further comprising the steps of:
   allowing a user to select an image pattern to produce user information;
   acquiring the compression method determination information based on the user information; and
   determining the method of compressing the source reproducible color gamut based on the compression method determination information acquired based on the user information.

5. The reproducible color gamut compression method according to claim 1, the method being adapted for computation of the compression ratio whereby the source reproducible color gamut of a display device, of a type characterized by an additive process of colors, is compressed, and further comprising the steps of:
   computing the compression ratio of each of complementary colors of three color signals constructing the image data to be displayed, based on the principle of the additive process; and
   applying the computed compression ratio for each hue.

6. The reproducible color gamut compression method according to claim 1, further comprising the steps of:
   computing the compression ratio used to compress the source reproducible color gamut, in one of an input color space and chromaticity coordinates; and
   performing reproducible color gamut compression using a compression method acquired on the basis of the computed compression ratio.

7. A reproducible color gamut compression apparatus, comprising:
- image data input means for receiving image data constructed of three color signals and displayed by a plurality of display devices that are mutually different in reproducible color gamut;
- target reproducible color gamut computing means for computing a target reproducible color gamut to which compression occurs, based on color reproduction characteristics of the plurality of display devices, and outputting reproducible color gamut information;
- compression ratio computing means for computing a compression ratio used to compress a source reproducible color gamut, based on the reproducible color gamuts of the display devices and the reproducible color gamut information output from said target reproducible color gamut computing means;
- compression method determination information acquiring means for acquiring compression method determination information used to determine a method of compressing the source reproducible color gamut;
- compression method determining means for determining the compression method used to compress the source reproducible color gamut, using the compression method determination information acquired by said compression method determination information acquiring means; and
- reproducible color gamut compressing means for converting the source reproducible color gamut into the target reproducible color gamut, using the compression method determined by said compression method determining means.

8. The reproducible color gamut compression apparatus according to claim 7, wherein said compression method determination information acquiring means extracts an characteristic factor by analyzing a distribution pattern of data of the image to be displayed, so as to determine the compression method determination information, based on a result of computation on the characteristic factor and on a predetermined reference value, and wherein said compression method determining means has a function of determining the method of compressing the source reproducible color gamut, based on the compression method determination information acquired by said compression method determination information acquiring means.

9. The reproducible color gamut compression apparatus according to claim 8, wherein one of a tone-level distribution, a color saturation level distribution and a brightness level distribution, determined from pixel-by-pixel signal values of the image data, is examined by said compression method determination information acquiring means in extracting the characteristic factor.

10. The reproducible color compression apparatus according to claim 7, further comprising:
- user information acquiring means for allowing a user to select an image pattern so as to produce user information, wherein
- said compression method determination information acquiring means has a function of acquiring the compression method determination information, based on the user information.

11. The reproducible color gamut compression apparatus according to claim 7, the apparatus being adapted for computation of the compression ratio whereby the source reproducible color gamut of a display device, of a type characterized by an additive process of colors, is compressed, wherein
- said compression ratio computing means comprises:
- individual hue compression ratio computing means for computing the compression ratio of each of complementary colors of three color signals constructing the image data to be displayed, based on the principle of the additive process, and applying the computed compression ratio for each hue.

12. A reproducible color gamut compression apparatus for use in displaying image data on a plurality of devices having mutually different reproducible color gamuts, the method comprising:
- an image data input for receiving image data including three color signals;
- a target reproducible color gamut computing unit for computing a target reproducible color gamut based on color reproduction characteristics of the plurality of devices, and outputting common reproducible color gamut information;
- a compression ratio computing unit for computing a compression ratio to compress a source reproducible color gamut based on a reproducible color gamut of a target device and the common reproducible color gamut information;
- a compression method determination unit for acquiring compression method determination information and determining a method of compressing the source reproducible color gamut based on the acquired information; and
- a reproducible color gamut compressing unit for converting a source reproducible color gamut into the target reproducible color gamut using the determined compression method.

13. The reproducible color gamut compression apparatus according to claim 12, further comprising:
- a user information input for allowing a user to select an image pattern to produce user information; and
- wherein the acquired compression method determination information includes the user information.

14. The reproducible color gamut compression apparatus according a claim 12, wherein the compression ratio computing unit comprises:
- an individual hue compression ratio computing unit for computing the compression ratio of each of complementary colors of three color signals constructing the image data to be displayed based on a principle of an additive process of colors.

15. The reproducible color gamut compression apparatus according to claim 12, wherein the common reproducible color gamut information comprises a triangle formed by points closest to respective R, G, B chromaticity points of the plurality of devices.

16. The reproducible color gamut compression apparatus according to claim 15, wherein the brightness Y of each of the R, G, B points is different from device to device.

* * * * *